S. S. WATERS.
COMBINED AUTOMATIC MUSICAL INSTRUMENT.
APPLICATION FILED DEC. 12, 1911.
1,265,559.
Patented May 7, 1918.
7 SHEETS—SHEET 4.
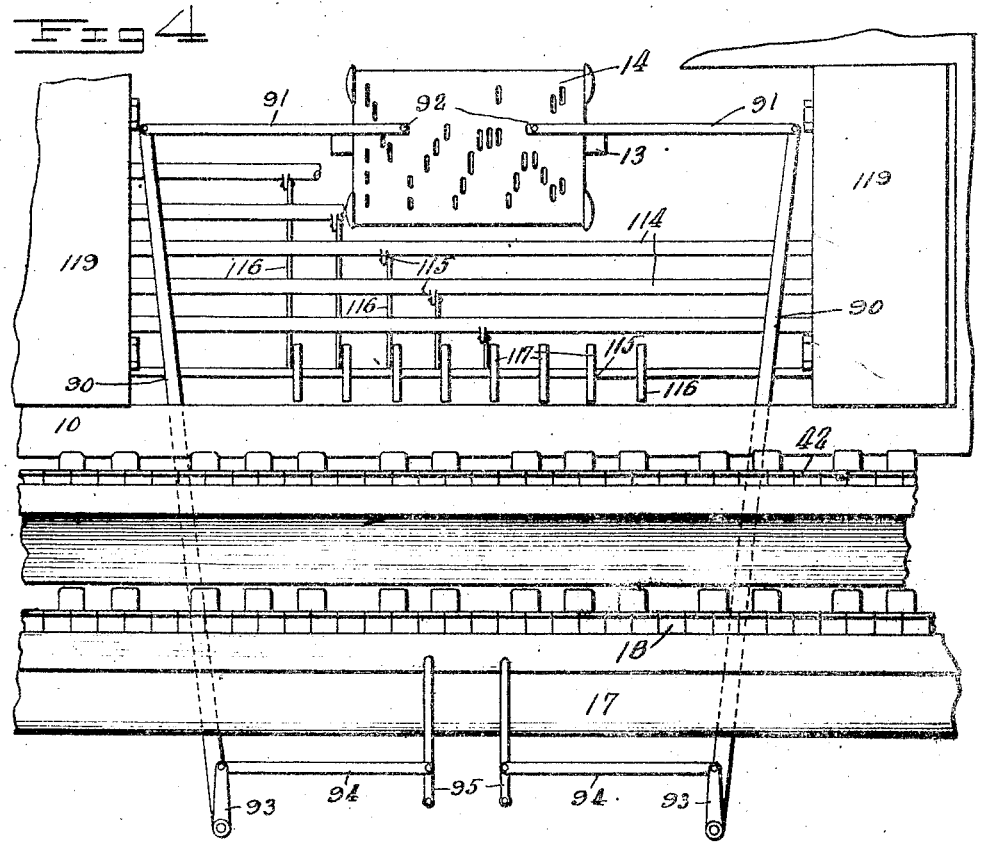
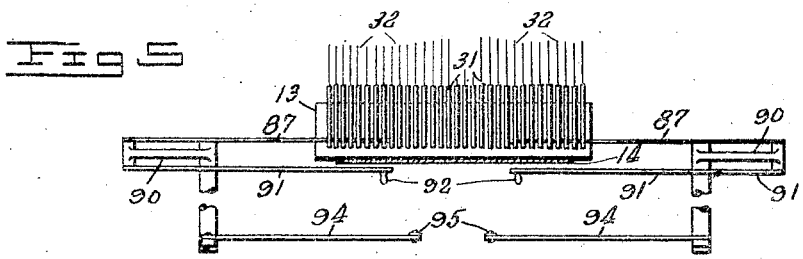
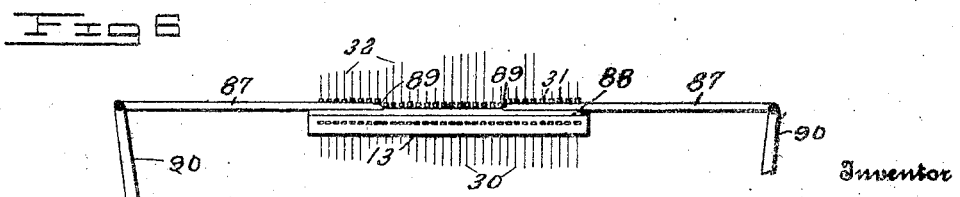
Witnesses
Inventor
Samuel S. Waters
By Meyers, Cushman & Rea
Attorney S. S. WATERS.
COMBINED AUTOMATIC MUSICAL INSTRUMENT.
APPLICATION FILED DEC. 12, 1911.
1,265,559.
Patented May 7, 1918.
7 SHEETS—SHEET 5.
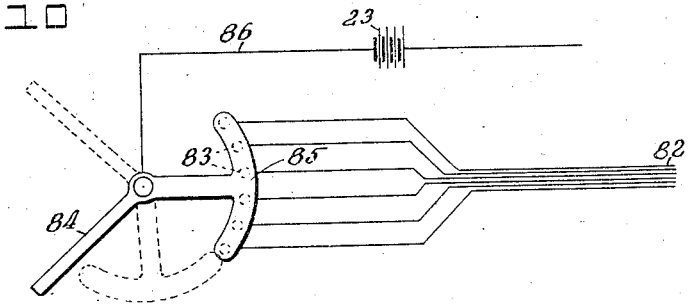
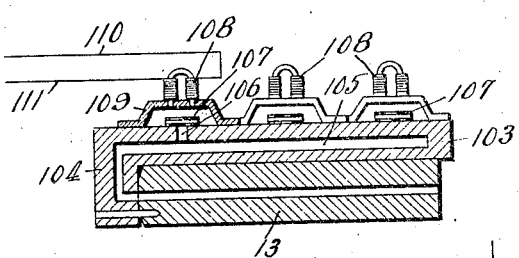
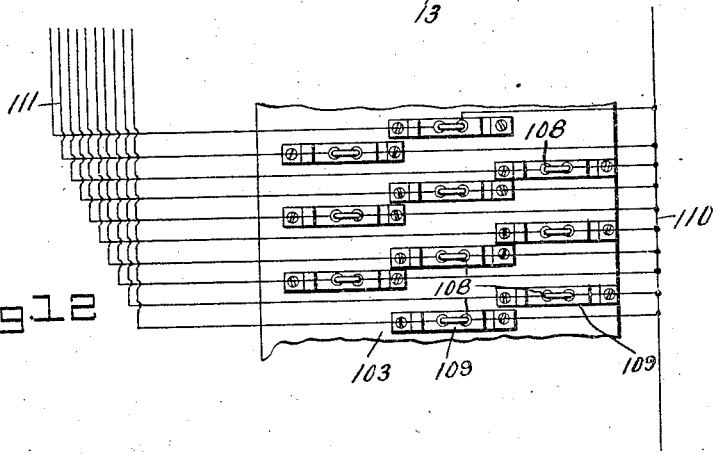
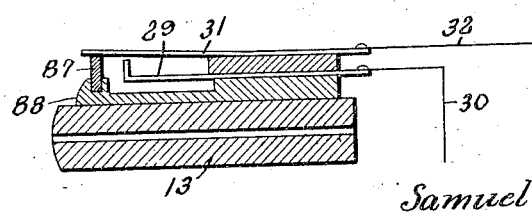
Inventor
Samuel S. Waters
Witnesses
By Meyers Cushman Rea
Attorney S. S. WATERS.
COMBINED AUTOMATIC MUSICAL INSTRUMENT.
APPLICATION FILED DEC. 12, 1911.

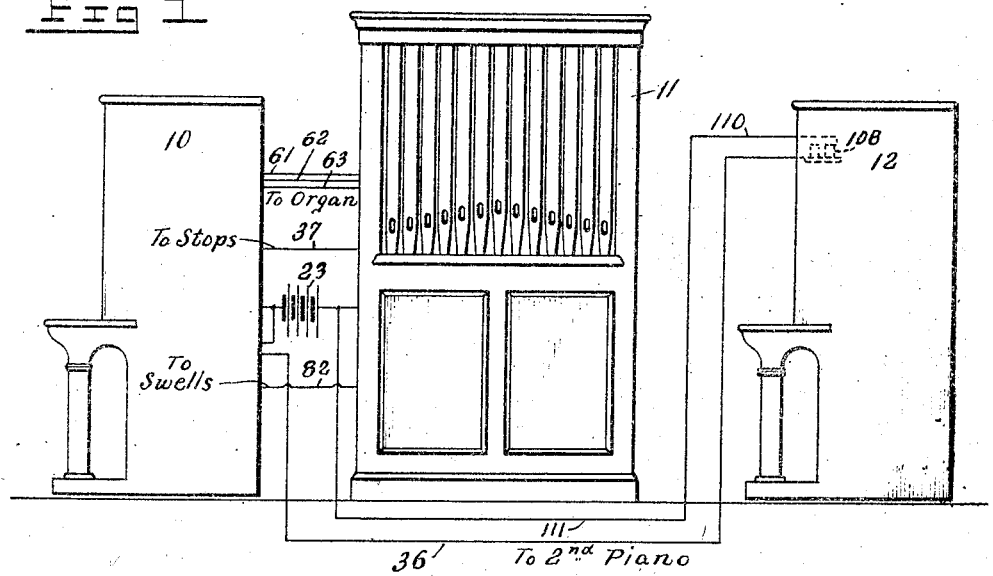
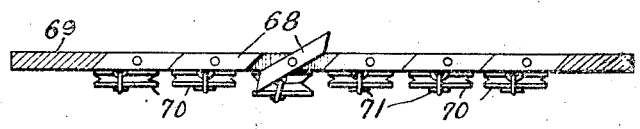
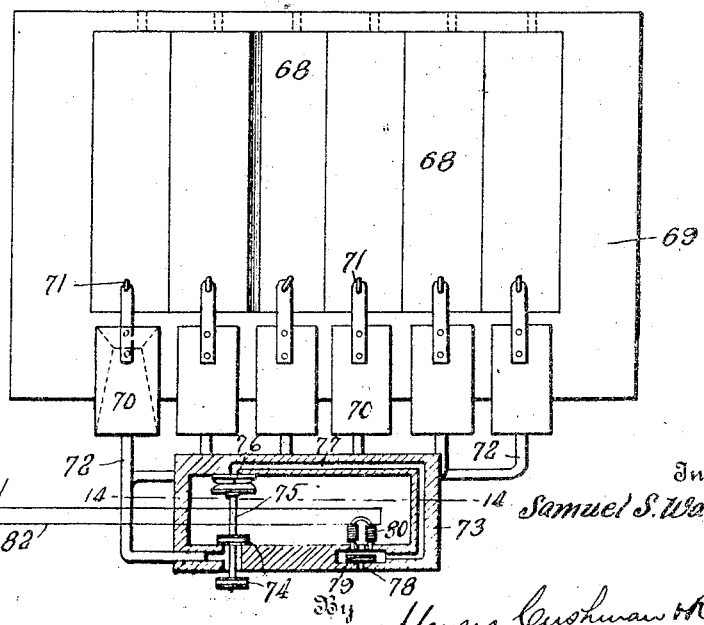

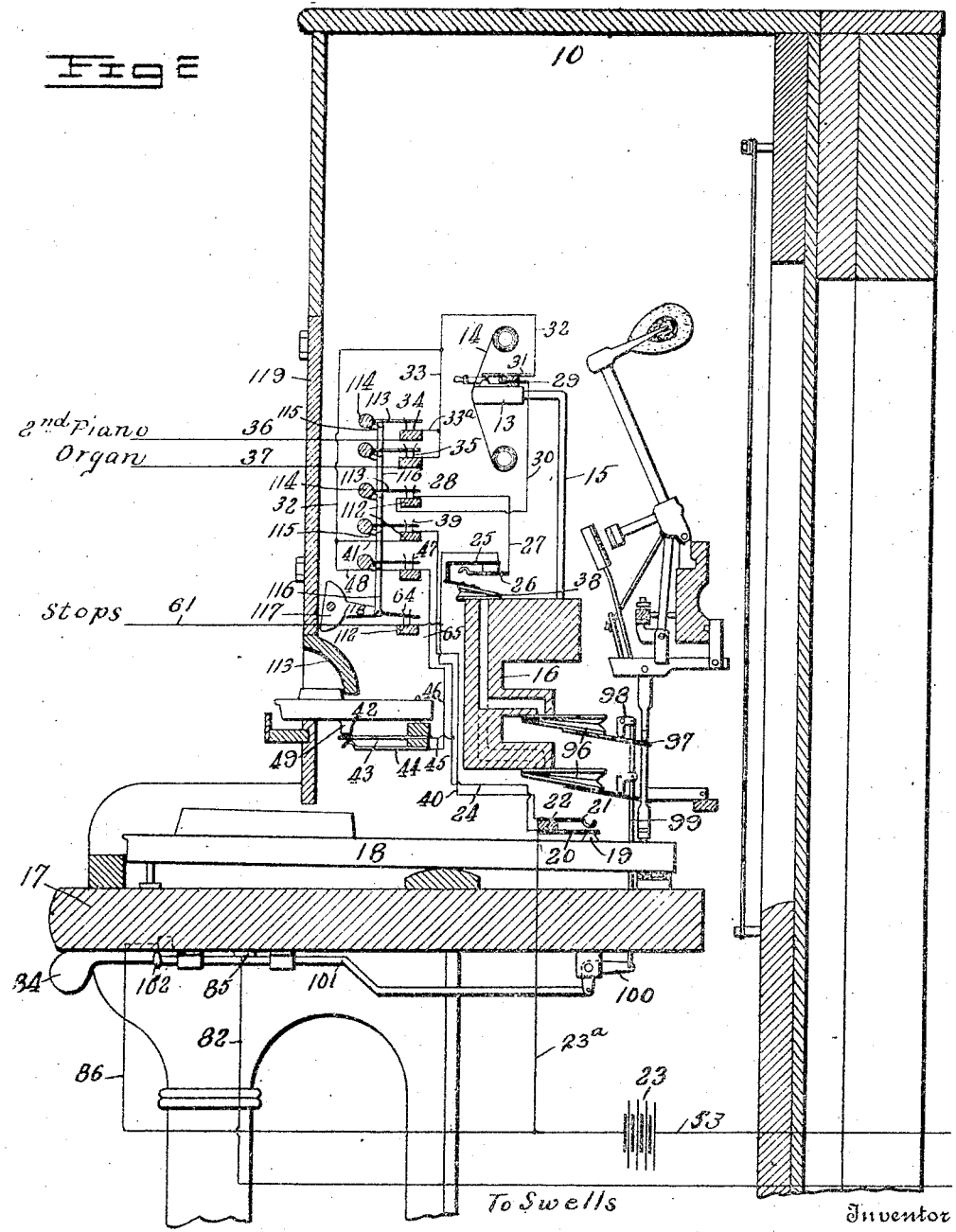

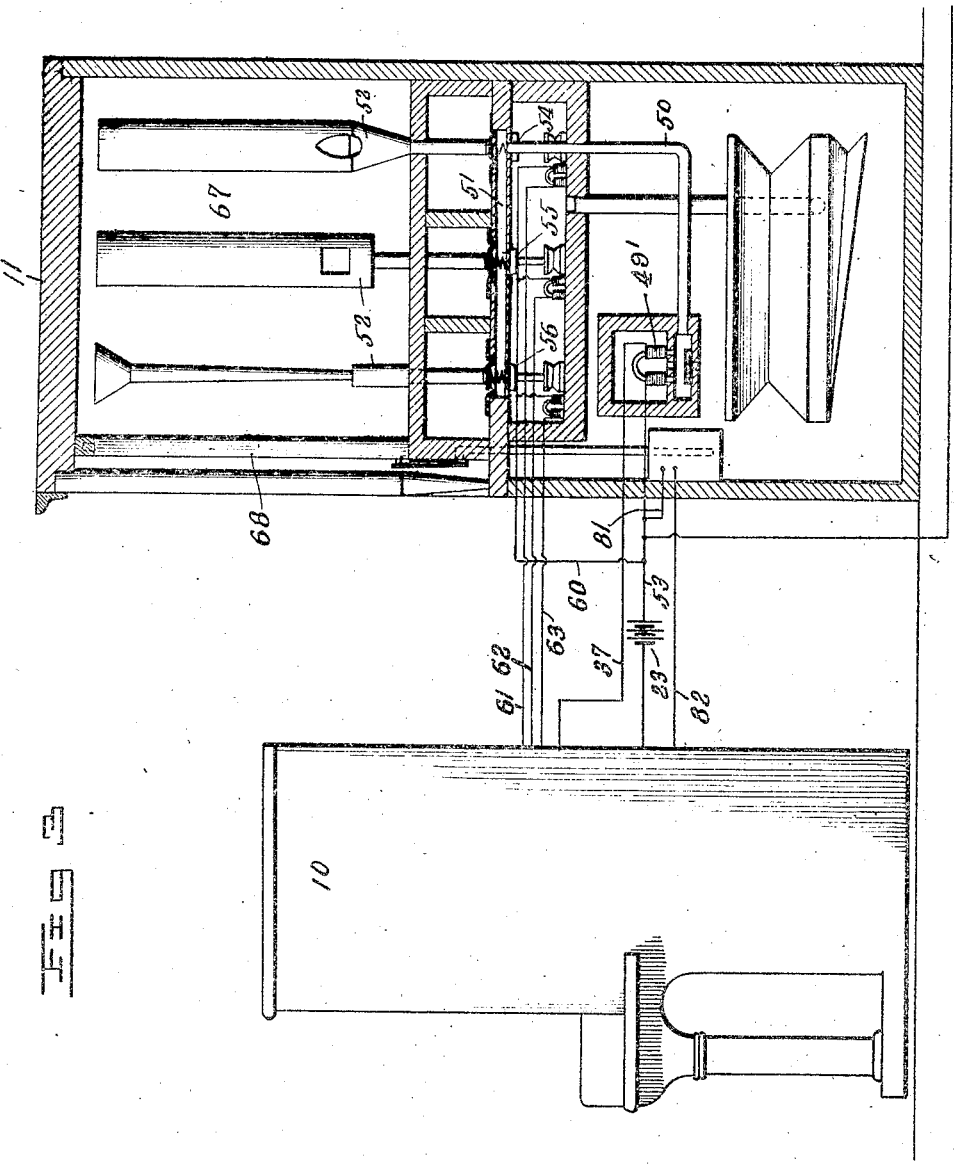

1,265,559.

Patented May 7, 1918.
7 SHEETS—SHEET 6.

Witnesses
H. A. Robinette
J. J. Mawhinney

Inventor
Samuel S. Waters
By Meyers, Cushman & Rea
Attorney

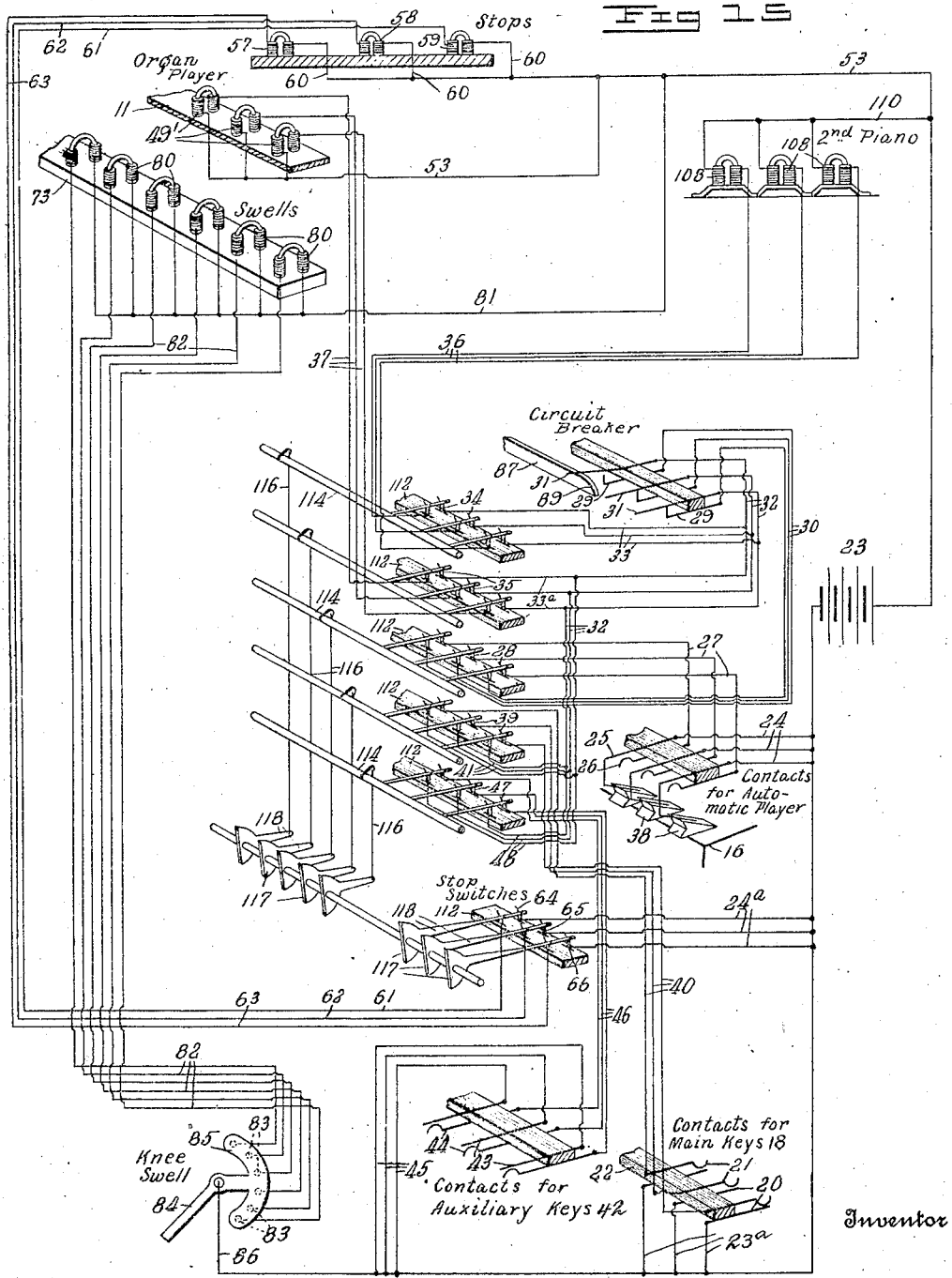

UNITED STATES PATENT OFFICE.

SAMUEL S. WATERS, OF WASHINGTON, DISTRICT OF COLUMBIA.

COMBINED AUTOMATIC MUSICAL INSTRUMENT.

1,265,559.	Specification of Letters Patent.	Patented May 7, 1918.

Application filed December 12, 1911. Serial No. 665,266.

*To all whom it may concern:*

Be it known that I, SAMUEL S. WATERS, a citizen of the United States, residing at Washington, in the District of Columbia, have invented new and useful Improvements in Combined Automatic Musical Instruments, of which the following is a specification.

This invention relates to music playing apparatus, and particularly refers to musical instruments adapted to be played manually or automatically, having for an object to provide such modifications and attachments with respect to these musical instruments as to combine their action to produce certain harmonious effects.

One of the principal objects of this invention is to provide a player piano with an additional or auxiliary bank of keys which are associated with organ or other instrument-playing mechanisms to manually operate the latter in addition to and irrespective of the player piano, as desired. Thus various harmonious results may be produced by the combined action of all of the player mechanisms and be controlled from one instrument.

Another object of this invention is to provide means whereby a master-player instrument has complete control over the operation of other player instruments, such as organs, player-pianos, drums, cymbals, and all other instruments which are automatic in operation, thereby obtaining a harmonious combination resembling an orchestra.

In the present embodiment of the invention the master instrument is disclosed in the form of a player piano arranged in electrical circuit with an organ and a second player piano, whereby all three instruments are controlled simultaneously from one instrument,—the master player piano. The master instrument is provided with means for controlling the rendering of the accompaniment, or melody, by one or all of the instruments in circuit, and is further provided with means, embodying a separate bank of keys, for manually operating the instruments in circuit irrespective of the self-playing mechanism of the master instrument.

In the disclosed embodiment of the invention, the master piano controls the organ and second player piano in the following combinations.

(*a*) The master player piano may automatically cause all three of the instruments to play at the same time.

(*b*) The master player piano may automatically cause the organ alone to play.

(*c*) The master player piano may automatically cause the second piano and itself to play in part, and cause the organ to supply the remaining part of the harmony.

(*d*) The master player piano may be manually operated to play alone.

(*e*) The master player piano may be adjusted not only to play itself when manually operated but also to play at the same time the organ and the second player piano.

(*f*) The master player piano may be manually operated to cause the second piano and the organ to play in part only, such as certain chords, or melodies, while the master player piano alone produces the accompaniment.

(*g*) The master player piano may automatically cause the playing of the organ and the second player piano in any of the above combinations, and at the same time may be manually operated, by the auxiliary bank of keys, to effect the playing of additional notes or chords to fill in or strengthen certain parts of the composition being executed, as desired.

With adjustments of this nature the various instruments may be so connected in circuit that any one of them may be made to play a solo while the remaining instruments play the accompaniment. In conjunction with this feature the invention provides for an indicator on the master player piano to show which notes on the controlled instruments are in adjustment to respond to the operation of the master instrument.

A further object of this invention is to provide manually operable means on the master piano for controlling the swell of the organ independently of the usual piano pedal control for the master instrument.

Other important objects and advantages of this invention will appear from the specific disclosure in the following specification of one embodiment of the invention, and illustrated in the accompanying drawings, in which:

Figure 1 is a view in elevation of three instruments associated in accordance with this invention.

Fig. 2 is a sectional view taken vertically through the master player piano.

Fig. 3 is a view in elevation of the master player piano and its connection with the organ, the latter being disclosed in section.

Fig. 4 is a detail view showing in front elevation the several banks of keys and the circuit controlling and indicating mechanism of the master instrument.

Fig. 5 is a detail view showing the circuit controlling and indicating mechanisms in top plan, the note sheet being shown in section.

Fig. 6 is a detail front elevation of the tracker board, its switches, and the controlling mechanism for the switches, the indicating mechanism being broken away.

Fig. 7 is a detail enlarged view showing a transverse section through the tracker board, one of the switches mounted thereon, and the controlling mechanism, the switch being open.

Fig. 8 is a front elevation of the swell box of the organ showing the louver blinds and their operating mechanism.

Fig. 9 is a section through the top of the same, showing one of the blinds open.

Fig. 10 is a diagrammatic view of the knee-swell of the master player instrument and its electrical connections.

Fig. 11 is a transverse sectional view through the tracker mechanism of the dependent player piano.

Fig. 12 is a top plan view of a portion of the same.

Fig. 15 is a diagrammatic view showing the electric circuits connecting the various operative parts of the several instruments.

Figure 13:
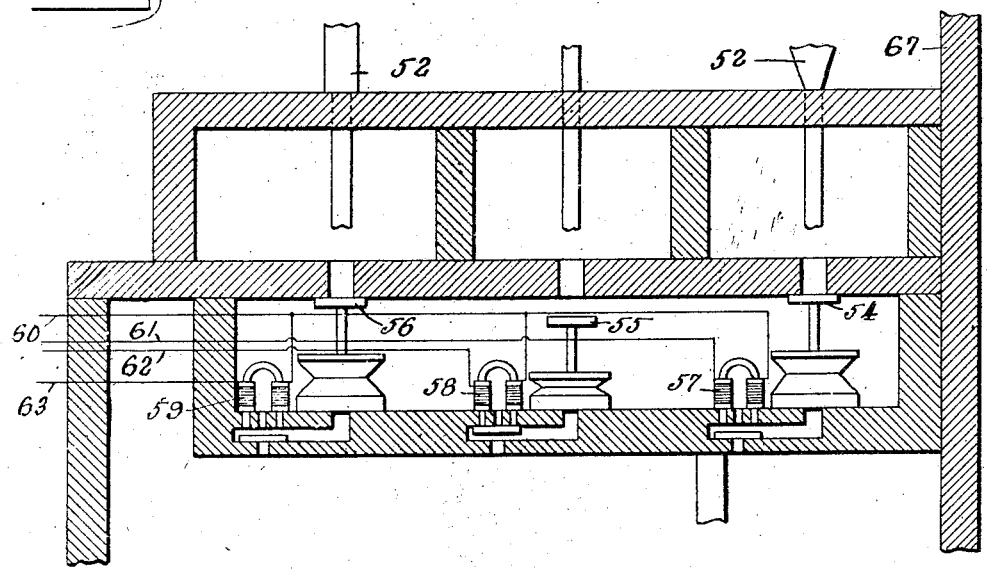
Fig. 13 is a sectional view through the organ showing the separate stop mechanisms.
Figure 14:
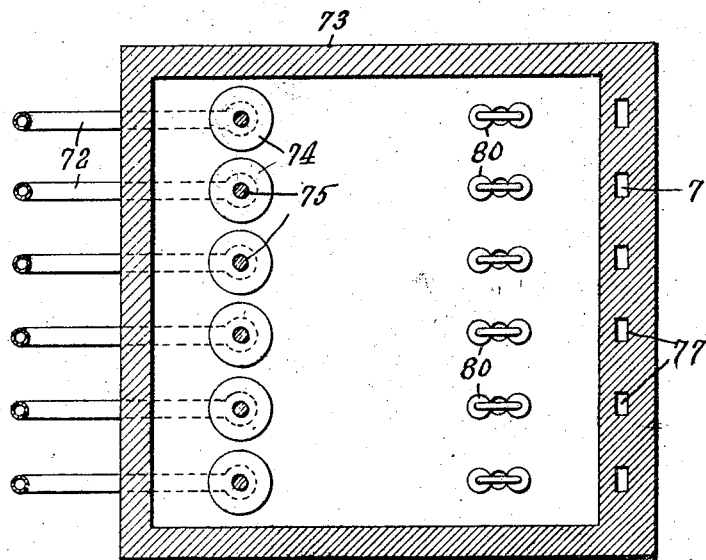
Fig. 14 is a section on the line 14—14 of Fig. 8.

Referring to the drawings, in which like parts are designated by similar characters of reference throughout the several views, and referring particularly to Fig. 1, 10 designates a master player instrument connected by electrical circuits with an organ 11 and a second or dependent player piano 12.

The master player instrument is disclosed particularly in Fig. 2 in the form of a player piano of common construction provided with the usual tracker 13 over which passes the note sheet 14, the tracker 13 being connected by the air tubes or ducts 15 to the pneumatic operating mechanism 16. The key bed 17 of the piano 10 carries the usual number of keys 18, each being provided with a stud or projection 19 adjacent to its rear end, which extends upwardly and bears against the lower one of a pair of contacts 20 and 21 mounted upon a supporting strip 22 above the key 18. It is, of course, understood that a pair of contacts 20 and 21 is provided for each key 18, and the drawings disclose the contacts normally open and to be closed by the operation of the separate keys. The lower contacts 20 are all in direct connection through wires 23ª with a source of energy 23, in the present instance disclosed as a battery. Wires 24 connect the source of energy 23 to the upper contacts 25 of a number of automatic switches controlled by the pneumatic player mechanism 16. The lower contacts 26 of these automatic switches are connected by wires 27 to a like number of controlling switches 28 which are in turn in communication with the lower contacts 29 of the tracker switches by wires 30. The upper spring contacts 31 of the tracker switches are normally closed and are connected to main wires 32 from which branch wires 33, and 33ª leading respectively to the second player piano gang switches 34 and the organ switch 35. From the opposite sides of the gang switches 34 and 36 are lead wires 36 and 37 leading respectively to the second player piano and the organ.

Circuits are closed through the above described switches and wires when it is desired to operate the mechanism of the master player piano automatically, the automatic switches corresponding to the various notes of the instrument being operated by separate pneumatics 38.

Should it be desired to disconnect the pneumatic player mechanism 16 and operate the master instrument manually by depressing the various keys 18, the switch 39 is closed. When a key 18 is depressed its stud 19 raises the corresponding lower contact 20 into engagement with the upper contact 21, closing the circuit through the wire 40 leading into one side of the corresponding switch 39. Each switch 39 communicates by a wire 41 with the main wire 32 leading into the branch 33 and through the gang switches 34 and the organ gang switches 35 to the second player piano and the organ, either one or both of the same as desired.

The master player instrument is provided with an auxiliary or second set of keys 42. Mounted immediately beneath each of the auxiliary keys 42 is a pair of normally open contacts 43 and 44. The upper contacts 43 are connected by the branches 45 to the feed wire leading from the battery 23, while the lower contacts 44 are connected by wires 46 to the auxiliary gang key switches 47. The opposite side of the key switch 47 is in circuit with the wire 32 or 33 through a branch 48. Each key 42 is provided with a depending lug or projection 49 normally resting against the adjacent upper contact 43, and serving to depress the same against the registering contact 44 when the key 42 is depressed. With this arrangement the player instruments connected to the gang switches 34 and 35 may be operated manually by the keys 42 irrespective of the playing of these instruments by the pneumatic mechanism 16 or by the manually operable keys 18. When a key 42 is depressed current flows from the battery 23 through the branch 45 to the upper contact 43. It passes through the lower contact 44 and through the wire 46 to the auxiliary gang key switches 47, through which the current passes over the branch 48, to main wire 32, and thence through the wire 33 and 33ᵃ to the gang switches 34 and 35. It is readily seen that this circuit does not interfere with the circuits which may be closed through the switches 28 and 39, admitting of the playing of the piano by the pneumatic mechanism or the manually operable keys.

Referring particularly to Figs. 2, 3 and 15, it will be noted that the wires 37 lead from the gang switches 35 to the corresponding magnets 49' arranged in the wind chest of the organ 11, the magnets when energized raising corresponding pallets exhausting air from the duct 50 opening into the cross channel 51. The pipes 52 in the swell box of the organ, as shown in Fig. 3, are connected in the usual manner with the cross channel 51 so as to effect the speaking of the pipes in accordance with the operation of the stops. From the magnets 49' current passes through the wire 53 to the battery 23.

The organ in the present instance being relatively small is disclosed, particularly in Figs. 3, 13 and 15 as having but three stops, 54, 55, and 56, each of which is operated by the separate magnets 57, 58 and 59. The magnets 57, 58 and 59 are connected to the battery 23 through wires 60 connected to the return wire 53. Wires 61, 62 and 63 lead from the stop magnets to the master player instrument, and are connected with corresponding independent switches 64, 65 and 66 which are connected by branches 24ᵃ to the battery 23. These stops 54, 55 and 56 may be independently opened by closing their respective switches 64, 65 and 66, as is desired by the operator of the master player piano.

From Fig. 3 it will be noted that all of the pipes are located in the swell box 67, and that the swell box is provided with the usual louver blinds 68. From Figs. 8 and 9 it will be seen that the front 69 of the swell box is provided with a series of pneumatics 70 suitably coupled by links 71 independently to the louver blinds 68 so as to open and close the same. The pneumatics 70 are connected through air ducts 72 to a wind box 73 provided with a pair of opposed and alternately opening and closing pallets 74 mounted upon a stem 75 carried on the movable portion of the pneumatic 76 communicating with the cross channel 77 formed in the walls of the wind box 73. The opposite end of the cross channel 77 opens into the duct or passage 78 extending through the wall of the wind box 73. A valve or pallet 79 is arranged midway of the ends of the duct 78 so as to alternately close the interior of the wind box to the duct 77 and to the atmosphere. It will be understood that the wind box 73 is provided with a series of cross channels 77 corresponding in number to the pneumatics 70 and their operating mechanism, a magnet 80 being located preferably within the wind box 73 over each pallet 79. As will be seen from Fig. 15, one side of each of the magnets 80 is connected by a wire 81 to the return wire 53 of the battery 23, while the magnets 80 are connected at their opposite sides with a corresponding number of leads or wires 82 terminating in stud contacts 83 disposed in segmental relation beneath the key bed 17 of the master player piano. A knee-swell 84 is pivoted midway of its ends in a suitable manner against the underside of the key-bed 17, having its outer end substantially flush with the outer edge of the key bed 17 for operation to swing the same laterally, and being provided upon its inner end with a segment 85 adapted to traverse the contact studs 83 and close the circuit through as many of the magnets 80 as is desired. A wire 86 leads from the pivotal support of the knee-swell 84 to the battery 23 to complete the circuit through the magnets 80.

Normally the contacts 29 and 31 of the tracker switches on the master player piano are closed, and when it is desired to render inoperative certain of the notes upon the dependent instrument, and to not interfere with the operation of the same notes upon the master player piano, these contacts 29 and 31 are separated. To effect the opening of these switches a pair of slides 87 are held vertically for sliding movement in grooved rests 88 attached to the upper side of the tracker 13. These slides 87 are provided with beveled ends 89 adapted to move beneath the elongated extremities of the upper contacts 31, and to lift the same whereby the slides 87 are permitted to move clear across the tracker beneath the contacts. The slides 87 are arranged for movement beneath the contacts 31 from opposite sides of the tracker 13, and are hinged at their outer ends upon the upper extremities of rocker arms 90 arranged in the frame of the master instrument 10, so as to swing toward and from each other to impart a like movement to the slides 87 to raise the contacts consecutively from the opposite ends of the tracker. For the purpose of indicating to the operator the exact positions of the extremities of the slides 87, indicator arms 91 are employed, which are arranged in parallel fixed relation with the slides 87 and are of the same length so as to move toward and from each other, and being advanced forwardly for movement in front of the note sheet 14. The indicator arms 91 are provided with knobs 92 adapted to be grasped by the operator to move the same into the desired positions to cut off the desired notes.

Other means is provided however for controlling the positions of the slides 87, the same comprising crank arms 93, upstanding from the lower ends of the rocker arms 90, adapted to swing concentric with the latter, and being connected by links 94 to hand levers 95 hinged upon the frame of the master instrument in suitable position in front of the key-bed for operation by the operator of the instrument.

In conjunction with the pneumatic operating mechanism 16 for playing the master piano, means is provided for locking the pneumatics 96 against movement to actuate the hammer mechanisms in order to effect the playing of the organ or dependent player piano without sounding the master player piano. This means as shown in Fig. 2 comprises arms 97 extending rearwardly from the pneumatics 96, and in the path of the bell crank levers 98 hinged upon suitable rods for registration with the pneumatics 96, having one of their arms connected to a rod 99 for swinging their free or opposite arms down against the arms 97 of the pneumatics to prevent the latter from collapsing. The rod 99 is connected to a bell hanger 100 to which is attached a pull rod 101 having a knob 102 at its outer end located beneath the key-bed 17 adjacent to its outer edge.

The automatic playing mechanism of the second player piano is of substantially common form, the difference residing in the application of a magnet-controlled tracker opening mechanism in lieu of the usual note sheet, the improved mechanism comprising a channel board 103 fitting over the tracker 13 of the player piano mechanism, and having a depending portion 104 covering the openings of the tracker, and taking the place of the note sheet. The channel board 103 is provided with a plurality of cross channels 105 corresponding in number to the channels in the tracker 13 and opening directly into the same. Each of the channels 105 is provided with a port 106 opening into the atmosphere, and normally closed by a valve 107. A magnet 108 is arranged upon a suitable bracket or other mounting 109 immediately over each one of the valves 107, and upon energization of the magnet 108 the valve 107 is lifted from the port 106 to admit air into the corresponding tracker channel. One side of each of the magnets is each connected to the battery 23 by a wire 110 which has connection with the main wire 53. The opposite wires 36 of the magnets 108 are carried to the master instrument 10 and are connected to the corresponding gang switches 34 of the master instrument so as to independently actuate each of the keys.

The sets of switches 34, 35, 28, 39, 47, 64, 65 and 66 are each mounted upon strips or bars 112 extending across the interior of the casing of the master player piano. The spring contacts of these switches are electrically connected by blades 113 which are carried upon cross rods 114 having outstanding arms 115 to which links 116 are connected, turning the rods 114 and raising the blades 113 into and out of engagement with the springs of the switches. Tilting tablets 117 are hinged across the forward side of the master player piano and have inwardly extending arms 118 independently connected to the respective links 116 of the rods 114 so as to independently rock the rods and operate the switches in separate groups.

From the foregoing description it will be seen that the operation of the improved playing apparatus will take place as follows:—

When the self-playing mechanism 16 is put into operation to play the master instrument, the push rod 101 is drawn forwardly to throw the bell crank levers 99 out of the path of the arms 97 and admit of the uninterrupted movement of the pneumatics 96. At this time the keys 18 are not operative, or at least their operation is not counted upon for closing the circuit through the various switches, but the pneumatics 38 are operated to close the corresponding contacts 25 and 26 to close the circuits through the switches 28 and the tracker switches, which in turn are in circuit with the dependent player piano through the gang switches 34 and the organ through the gang switches 35. When the two latter switches, 34 and 35, are closed all three instruments are in operation. With special reference to Figs. 2, 11, 12 and 15, it will be noted that when the switches 34 are closed the current passes from the battery 23 through the switches 34 and corresponding wires 36 leading to the independent player piano. The current passes from the wires 36 through the magnets 108 and returns to the battery 23 through the return wires 110. The current in the circuits thus described energize the corresponding magnets 108 which raise the corresponding valves 107 and open the respective ducts in the tracker board 13. Thus, the magnets 108 operate upon the tracker board 13 of the dependent piano simultaneously with the striking of the respective notes upon the master instrument.

From Figs. 2, 3 and 15 it will be seen that when the switches 35 are closed the current passes from the battery 23 through the switches 35 and respective wires 37 to the magnets 49' in the organ 11, the current returning through the wire 53 to the battery 23. The magnets 49' being thus energized, the corresponding valves are opened and the air in the cross channel 51 is liberated, as heretofore specifically pointed out.

It is thus noted that when the gang switches 35 are closed the organ is operated simultaneously with the sounding of the various notes of the master instrument.

The operator at the master instrument may control the organ stops by opening and closing the stopswitches 64, 65 and 66 located on the master instrument, (Figs. 2 and 15) which open and close circuits through the stop magnets 57, 58 and 59, (Figs. 13 and 15) to actuate the stops in the usual manner. The knee swell (Figs. 2, 10 and 15) on the master instrument may also be controlled by the operator to throw the segment 85 across any desired number of contact studs 83 to close the circuits through the magnets 80 (Figs. 8 and 15) to open a corresponding number of louver blinds 68.

It may thus be noted that the operator seated before the master instrument has practically complete control over the playing and expression of the various other instruments connected with the master instrument.

If it is desired to silence the organ or dependent player piano, it is only necessary to open either one or both sets of switches 34 and 36 which control the circuits passing through the same.

When it is desired to actuate the master player instrument manually and to render the automatic player mechanisms 16 inoperative, the gang switches 39 are closed to place the contacts 20 and 21 in the circuit so that these contacts will be actuated upon the depression of their respective keys 18 to close the corresponding circuits. When one of the keys 18 is depressed it closes the contacts 20 and 21, whereby current passes from the battery 23 through these contacts and through the wires 40 to the switches 39. Current passes through the switches 39 and through the wires 41 to the main wires 32 from which the current passes through the branches 33 and 33ª to the switches 34 and 35.

It is thus seen that from this arrangement various combinations may be effected in playing certain of the instruments in part or in whole, together with the master player piano, or without the same. When it is desired that the master player piano play the accompaniment, and the organ only, or together with the dependent player piano, play the solo or melody, then the slides 87 are moved in from the opposite ends of the tracker 13 to open the tracker switches controlling the playing of the notes indicated toward the edges of the note sheet 14, which latter indicated notes may be arranged to correspond to the accompaniment so that the accompaniment will not be produced upon the organ or dependent piano, and will be played only by the master instrument. The slides 87 are thus used to control the playing of the bass or accompaniment and the treble or melody of the dependent instruments. The slides 87 may be adjusted to hold open all of the circuits controlling the melody so that the dependent instruments play only the bass or accompaniment or the slides 87 may be adjusted to hold open all of the circuits controlling the playing of the accompaniment so that the master instrument alone plays the accompaniment and the dependent instruments harmonize with and strengthen the melody of the master instrument. Thus the master instrument may be cut out wholly or in part from playing in the combination.

The casing of the master player piano 10 is provided with a hinged panel 119 in its front side, adapted to be swung into open position when it is desired to gain access to the tilting tablets 117 to operate the several circuit switches, and to observe the indicator mechanism in adjusting the slides 87. Any means other than the panel 119 may be employed to effect these results, if it is found more desirable.

The tilting tablets 117 are of substantial T-shape, having the cross-heads thereof facing outwardly and being operable by pressure of the fingers against the opposite ends of these heads to independently swing their arms about their common pivotal support to open and close these switches.

It will be understood that this invention is not limited to the specific combinations herein recited for blending the notes of the various instruments, but that the invention comprehends all other combinations and specific changes which may occur or be found practical in the use and installation of this musical apparatus, and which are within the scope of the appended claims.

What I claim is:

1. In combination with a piano having the usual keys, a pair of contacts for each key, a main electric circuit, branch circuits from said main circuit one for each pair of contacts and including the same, a plurality of dependent instruments, magnets carried by the instruments for playing the same and included in said branch circuits, a set of gang switches for each dependent instrument for optionally closing and opening the circuits to the magnets carried by each of said instruments, a set of normally closed circuit breakers in said branch circuits, and adjustable means for opening and holding open any number of said circuit breakers to control the playing of the dependent instruments.

2. In combination with a piano having the usual keys, a pair of contacts for each key, a main electric circuit, branch circuits therefrom one for each pair of contacts and including the same and adapted to be independently closed by the operation of the re spective keys, gang switches in said branch circuits adapted to open and close the same, dependent instruments, magnets for actuating said instruments and included in said branch circuits, and means in the branch circuits for rendering inert any desired number of the branch circuits.

3. In combination, a main electric circuit, branch circuits therefrom, a musical instrument having manually operable keys, a pair of contacts for each key included in said branch circuits, gang switches adapted to open and close the branch circuits, dependent instruments, magnets carried by the instruments for playing the same included in said branch circuits, gang switches one for each dependent instrument included in said branch circuits, a set of normally closed circuit breakers in said branch circuits, and adjustable means for opening and holding open any number of said circuit breakers to control the playing of the dependent instruments.

4. In combination with a musical instrument, automatic player mechanism in the instrument to sound the notes thereof, a pair of contacts for each note sounding device, means actuated simultaneously with each note sounding device and by the same power to close a pair of contacts, a main circuit, branch circuits therefrom including said pairs of contacts, independent sets of gang switches in said branch circuits to open and close the same, dependent instruments, magnets connected to said independent sets of switches controlling the playing of the dependent instruments, and adjustable circuit breakers in said branch circuits common to said sets of switches adapted to hold open any desired number of branch circuits.

5. In combination with a player piano, a pair of contacts for each note of the piano, means operated simultaneously with the player mechanism thereof for opening and closing said contacts, an electric circuit for each of said contacts, dependent instruments, electrically actuated means in said circuits carried by said dependent instruments for playing the same, and means in said circuits for rendering inert any number of the circuits.

6. In combination with a player piano, a pair of contacts for each note of the piano, means operable simultaneously with the player mechanism thereof for opening and closing said contacts, a main circuit, branch circuits therefrom including said pairs of contacts, an organ, organ playing magnets carried by the organ and included in said branch circuits, a circuit breaker on the piano adapted to hold open any desired number of the branch circuits, stops on the organ, stop-magnets controlling the stops, branch stop-circuits from said main circuit, independent stop switches carried by the piano and included in said branch stop circuits for operating the stops independently of one another, an organ swell, electromagnets controlling the operation of the swell, and an adjustable circuit closer on the piano for energizing any desired number of the swell electro-magnets.

7. In combination with a piano having the usual keys and note sounding mechanism, circuit closing contacts for said keys, a main electric circuit, branch circuits therefrom including said contacts for the usual keys, dependent instruments, electrically-controlled operating devices carried by said dependent instruments included in said branch circuits, an auxiliary bank of keys on said piano, pairs of contacts one for each of said auxiliary keys closed by the operation of said auxiliary keys, branch circuits including the pairs of contacts for said auxiliary keys, the contacts of the usual and auxiliary keys being operable independently of one another for closing the branch circuits through the dependent instruments and playing the same, and a set of gang switches in the branch circuits including the contacts for the usual keys and another set of gang switches in the branch circuits that include the contacts for the auxiliary keys for optionally cutting the contacts of the main keys and auxiliary keys into and out of circuit with the dependent instruments.

8. In combination with a piano having the usual keys, a pair of contacts for each key, a main circuit, branch circuits therefrom including the contacts, a set of gang switches on the piano in the branch circuits for opening and closing the same, an organ, organ player magnets in the branch circuits, a second set of gang switches on the piano in the branch circuits for closing the organ-player magnets in the branch circuits, a circuit breaker in the branch circuits for rendering any desired number of the circuits inert, stop-magnets on the organ for controlling the organ stops, an independent branch stop-circuit for each stop magnet, and a switch for each stop-circuit mounted on the piano.

9. In combination with a master instrument, a dependent instrument, circuits connecting said instruments, player mechanism in said master instrument, contacts included in said circuits, means operable simultaneously with said player mechanism to close and open said contacts and operate said dependent instrument, normally closed contacts in said master instrument and in said circuits, and slides carried on said master instrument located to adjustably engage between the said normally closed contacts to break any desired number of said normally closed circuits.

10. In combination with a master piano having keys and an automatic player mechanism, a number of dependent instruments, electric circuits corresponding in number to the keys of the master piano and connecting the dependent instruments to the master piano, contacts in said circuits operated by the keys, other contacts in said circuits operated simultaneously with the player mechanism, gang switches for said first mentioned contacts and gang switches for said second-mentioned contacts whereby to place the same independently in said circuits, circuit breakers for said circuits, and adjustable means engaging the circuit breakers whereby to break any desired number of said circuits.

11. In combination with a master player piano, a dependent instrument, electric circuits connecting said piano to said instrument, a plurality of normally closed circuit breakers in said circuits, and adjustable slides engaging the circuit breakers whereby to break any desired number of said circuits.

12. In combination with a master player piano, a dependent instrument, electric circuits connecting said instrument to said piano to play the same simultaneously, normally closed circuit breakers arranged in the circuits, slides adapted for engagement with the circuit breakers whereby to open any desired number of the circuits, and indicating means connected to said slides for indicating the position of the same.

13. In combination, a master instrument having a plurality of note sounding devices, and a pair of circuit closers for each of said devices, a dependent instrument having a plurality of corresponding note sounding devices, and electrical means for controlling the same, separate electric circuits including the circuit closers of the master instrument and the electrical controlling means of the dependent instrument, normally closed contacts in the circuits and arranged on said master instrument, adjustable separating means for the contacts adapted to break any desired number of said circuits, and indicating means upon the master instrument connected to said separating means adapted to indicate the circuits broken.

14. In combination with a master piano having the usual keys and an automatic player mechanism, a set of contacts operable by said keys, a second set of contacts operable simultaneously with the player mechanism, branch electric circuits including both sets of contacts, a plurality of dependent instruments, electrically-controlled operating devices for said dependent instruments included in said branch circuits, a set of gang switches for said first set of contacts and a set of gang switches for said second set of contacts to close the branch circuits independently through said first and second sets of contacts whereby to automatically play the master piano and dependent instruments by said player mechanism and to manually play the master piano and dependent instruments by said usual keys, and a gang switch in the branch circuits for each dependent instrument whereby said instruments may be independently cut-out of said branch circuits.

15. In combination with a piano having the usual note-sounding devices and a player mechanism including means for actuating the sounding devices, a dependent instrument having electrically controlled note-sounding devices, a set of contacts operable by said player mechanism, branch circuits including said set of contacts and said electrically-controlled note-sounding devices of the dependent instrument whereby upon operation of the player mechanism the piano and the dependent instrument are played, and silencing means for the piano adapted to engage said first-mentioned means and hold said means immovable during the operation of the player mechanism.

16. In combination with a piano having the usual note sounding devices and a player mechanism including means for actuating the note-sounding devices, a dependent instrument having electrically-controlled note-sounding devices, a set of contacts operable by said player mechanism, branch circuits including said set of contacts and electrically-controlled note-sounding devices of the dependent instrument whereby to play the piano and the dependent instrument by the player mechanism, silencing means for the piano adapted to engage said first-mentioned means and hold said means immovable during the operation of said player mechanism whereby the dependent instrument alone may be played by said player mechanism, and an adjustable circuit breaker in said branch circuits for holding open any desired number of branch circuits.

In testimony whereof I have hereunto set my hand in presence of two subscribing witnesses.

SAMUEL S. WATERS.

Witnesses:
GERTRUDE M. STUCKER,
J. J. MAWHINNEY.